United States Patent
Kito (10) Patent No.: US 6,263,207 B1
(45) Date of Patent: Jul. 17, 2001

(54) MOBILE RADIO COMMUNICATION SYSTEM AND RADIO CIRCUIT CONTROLLING METHOD THEREFOR

(75) Inventor: Eiji Kito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/099,532

(22) Filed: Jun. 16, 1998

(30) Foreign Application Priority Data

Jun. 27, 1997 (JP) .................................................... 9-172070

(51) Int. Cl.[7] ....................................................... H04Q 7/20
(52) U.S. Cl. .......................... 455/453; 455/452; 455/524
(58) Field of Search .................................. 455/440, 443, 455/450, 451, 452, 453, 455, 464, 466, 509, 512, 516, 524, 525, 447, 522, 445, 428

(56) References Cited

U.S. PATENT DOCUMENTS

| 4,670,899 | * | 6/1987 | Brody et al. ........................ 455/453 |
| 5,778,318 | * | 7/1998 | Talarmo et al. ..................... 455/452 |
| 5,884,187 | * | 3/1999 | Ziv et al. ............................. 455/522 |
| 5,893,035 | * | 4/1999 | Chen ................................... 455/522 |
| 5,923,650 | * | 7/1999 | Chen et al. .......................... 370/331 |
| 5,970,412 | * | 10/1999 | Maxemchuk ........................ 455/447 |
| 5,991,284 | * | 11/1999 | Willenegger et al. .............. 370/335 |
| 5,999,522 | * | 12/1999 | Rohani ................................ 370/331 |
| 5,999,816 | * | 12/1999 | Tiedemann, Jr. et al. .......... 455/437 |
| 6,026,081 | * | 2/2000 | Hamabe .............................. 370/335 |

\* cited by examiner

Primary Examiner—Nay Maung
Assistant Examiner—Jean A Gelin
(74) Attorney, Agent, or Firm—McGinn & Gibb, PLLC (57) ABSTRACT

A mobile radio communication system which sets a radio circuit efficiently without deteriorating the communication quality even when congestion of communication channels occurs. The mobile radio communication system includes a plurality of mobile stations, a plurality of base station which can be connected to the mobile stations through radio circuits, and mobile switching center for controlling connections between the mobile stations and the base station. The mobile switching center performs connection of the mobile stations and base station for the reverse-link from the mobile stations to the base station and the forward-link from the base station to the mobile stations independently of each other.

7 Claims, 6 Drawing Sheets

| | FORWARD RECEPTION POWER VALUE (dB) | FORWARD TRAFFIC (kbps) | REVERSE TRAFFIC (kbps) |
|---|---|---|---|
| MOBILE STATION 1 | 10 | 64 | 32 |
| MOBILE STATION 2 | 10 | 32 | 32 |
| MOBILE STATION 3 | 20 | 64 | 16 |
| MOBILE STATION 4 | 15 | 64 | 64 |
| MOBILE STATION 5 | 30 | 64 | 32 |

34 CALL MANAGEMENT TABLE

FIG.9

MOBILE RADIO COMMUNICATION SYSTEM AND RADIO CIRCUIT CONTROLLING METHOD THEREFOR

BACKGROUND OF THE INVENTION

1. Field of the Invention

This invention relates to a mobile radio communication system and a radio circuit controlling method therefor.

2. Description of the Related Art

Conventionally, in a mobile radio communication system which includes a plurality of base stations and a mobile station which can communicate with the plurality of base stations individually by radio, each of the base stations has a limited region (wireless zone) in which it provides services, and in principle, the mobile station communicates with one of the base stations which has a wireless zone in which the mobile station is currently present. However, in order to eliminate places in which the mobile station cannot communicate, the region in which each base station can communicate with the mobile station is actually set somewhat wider. Consequently, there actually is a region in which the mobile station can communicate with a plurality of base stations.

In such a conventional mobile ratio communication system as described above, communication is sometimes disabled when the traffic in a wireless zone of a base station is so great as to cause congestion of communication channels. Describing more particularly, in a mobile ratio communication system which employs a time division multiplex access (TDMA) mobile radio communication system, the congestion of communication channels is restricted by the number of radio circuits physically arranged in the wireless zone.

Therefore, conventionally, in order to establish a call connection between a certain base station and a mobile station which is present in the wireless zone of the base station, the mobile station measures the reception level of a radio wave transmitted from the base station to which a call connection is to be established and further measures the reception level of other radio wave transmitted from other base stations which are positioned around the wireless zone of the base station to which a call connection is to be established. The reception levels of the received signals measured by the mobile station are reported to the base stations.

Meanwhile, a host apparatus of the base stations supervises whether or not congestion of communication channels occurs in the wireless zone of each of the base stations, and if congestion of communication channels is detected and a free radio circuit is not available, the host apparatus confirms the reception levels reported from the mobile station which is communicating with the base station which has the wireless zone. If the host apparatus confirms, as a result of the confirmation of the reception levels, that the reception level of a radio wave transmitted from another base station is sufficiently high for the quality of the radio circuit to be secured, then it controls so that radio communication may be performed between the mobile station and the another base station although the another base station has a wireless zone different from the wireless zone set originally for the place.

Here, in a time division mobile radio communication system, for communication between a mobile station and a base station, the same frequency is used in a plurality of wireless zones at positions spaced away from each other by a distance larger than a distance set in advance. This presupposes that each base station communicates with mobile stations which are present in a wireless zone set for the base station, and is intended to achieve effective utilization of frequencies.

However, if, when congestion of communication channels occurs in a wireless zone, communication is performed between a mobile station and another base station ignoring the wireless zone division, then the communication is performed using the same frequency at positions spaced from each other by a smaller distance than the prescribed distance. Consequently, there is the possibility that interference may occur and cause failure of the communication.

On the other hand, in a mobile radio communication system which adopts a code division multiplex access (CDMA) mobile radio communication (CDMA) system, a radio wave transmitted from a mobile station becomes an interfering wave with another mobile station, resulting in deterioration of the communication quality of the latter mobile station.

Therefore, a base station measures the reception power in the reverse-link of a radio wave transmitted from a mobile station and then produces, based on a result of the measurement, a control signal for controlling the transmission power from the mobile station to a minimum value necessary to obtain a required quality, and transmits the control signal to the mobile station. As a result, the transmission power from the mobile station is controlled to the minimum value necessary to obtain the required quality.

Here, in a mobile radio communication system which adopts such a code division multiplex mobile radio communication system as described above, when a mobile station is present in an area in which the wireless zone of a certain base station and the wireless zone of another base station overlap with each other, the mobile station communicates with both of the two base stations and thus receives control signals transmitted from the two base stations. In this instance, the transmission power is set in accordance with that one of the received control signals which controls the transmission power to a lower value.

Normally, the transmission power is in most cases controlled to a lower value by a nearer base station.

By the way, if a mobile radio communication system which adopts the code division multiplex mobile radio communication system adopts a radio circuit controlling system adopted by the time division mobile radio communication system described above, then when congestion of communication channels occurs, a mobile station communicates not with the nearest base station but with another base station spaced by a larger distance, and consequently, a higher transmission power is required. In this instance, a radio wave transmitted from the radio station becomes an interfering wave with other mobile stations. Consequently, there is a problem in that the communication quality of the other mobile station cannot be maintained, resulting in a deterioration of service.

In this manner, the controlling method upon communication channel congestion adopted by such a time division mobile ratio communication system as described above conflicts with the controlling method in an ordinary code division multiplex mobile radio communication system.

By the way, as described above, a radio wave of a mobile station becomes an interfering wave with other mobile station principally in the reverse-link in which the radio wave is transmitted from the mobile station.

Further, actually the traffic of the forward-link and the traffic of the reverse-link in the wireless zone of a base station are sometimes different from each other (asymmetrical communication condition). For example, in data communication of the internet, the traffic in the forward-link is greater than the traffic in the reverse-link, and congestion of communication channels sometimes occurs only in the forward-link.

Here, in a controlling method adopted by such a time division mobile radio communication system as described above, if congestion of communication channels occurs, then since a mobile station is controlled so that it communicates with another base station in both the reverse-link and the forward-link, if congestion of communication channels occurs only in the forward-link, the mobile station is controlled so that also the communication thereof in the reverse-link in which no congestion of communication channels occurs is performed with the another base station, resulting in the possibility that the communication quality of the latter mobile station may be deteriorated.

Therefore, a mobile radio communication system which adopts the code division multiplex mobile radio communication system does not adopt a controlling method similar to that of the time division mobile radio communication system because interference occurs between mobile stations.

Further, where physical radio circuits are present, when the traffic exceeds a fixed level, control to prevent new communication from being started is performed.

SUMMARY OF THE INVENTION

It is an object of the present invention to provide a mobile radio communication system and a radio circuit controlling method therefor by which a radio circuit can be set efficiently without deteriorating the communication quality even when congestion of communication channel occurs.

In order to attain the object described above, according to an aspect of the present invention, a radio circuit controlling method for a mobile radio communication system which includes at least a plurality of mobile stations, a plurality of radio means which can be connected to the mobile stations through radio circuits, and radio control means for controlling connections between the mobile stations and the radio means comprises the step of performing connection of the mobile stations and the radio means for the reverse-link from the mobile stations to the radio means and the forward-link from the radio means to the mobile stations independently of each other.

More particularly, the base station of a mobile station is changed for either the reverse-link or the forward-link, whichever is in a congestion condition. This is particularly effective when congestion occurs in the forward-link.

Further, a selected base station selected for a mobile station is changed based on traffic at the base stations and reception levels of signals at the mobile station transmitted from the base stations.

Consequently, when a the mobile station in the wireless zone of one of the base stations, it sometimes performs communication with another base station in either the reverse-link or the forward-link.

By the construction described above, when the radio circuits are utilized effectively, a situation in which communication is disabled by occurrence of congestion at one of the base stations can be prevented.

According to another aspect of the present invention, a radio circuit controlling method for a mobile radio communication system comprises the steps of measuring congestion in the reverse-link and forward-link of a base station, switching the reverse-link or forward-link of a mobile station in the wireless zone of the base station so as to communicate with an adjacent base station, measuring reception levels of signals from the base station and adjacent base station by the mobile station, reporting the reception levels and a transmission power of the base station to the adjacent base station, and controlling the transmission power of the base station or the adjacent base station and controlling the transmission power of the mobile station based on the reported reception levels and transmission power.

A base station at which detects congestion is detected is switched either for the reverse-link or forward-link. The base station which communicates in the reverse-link with a mobile station transmits a control signal for the transmission power of the mobile station. In order to secure the quality of communication to the mobile station, the reception level at the mobile station of a radio wave transmitted from the base station is reported to that one of the base station which communicates in the forward-link, and the forward transmission power is controlled based on the reported reception level.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

First Embodiment

Figure 1:
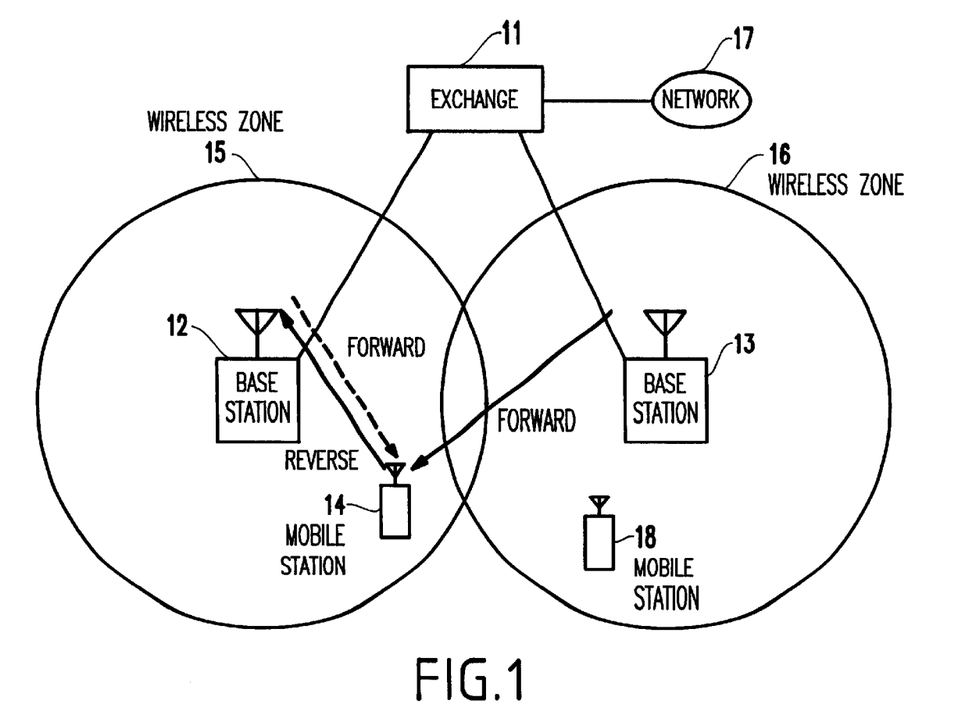
FIG. 1 is a diagrammatic view showing an embodiment of a mobile radio communication system of the present invention.

The present embodiment includes, as shown in FIG. 1, a plurality of mobile stations 14, 18 (only two mobile stations is shown), a plurality of base stations 12, 13 (only two base stations are shown) connected to mobile station 14 over radio circuits and serving as radio means, and one or more mobile switching centers 11 (only one mobile switching center is shown) connected to base stations 12, 13 and network 17 for switching connections between base stations 12, 13 and mobile station 14 and performing switching control with network 17. It is to be noted that mobile station 14 is a so-called portable telephone set and communicates with network 17 through base station 12 and mobile switching center 11.

In order to make it possible to keep the continuity of service areas which can be used by mobile station 14, wireless zone 15 of base station 12 and wireless zone 16 of adjacent base station 13 are provided in an overlapping relationship with each other. While only one adjacent zone is shown in FIG. 1, actually single wireless zone 15 is surrounded by wireless zones of a large number of base stations.

Figure 2:
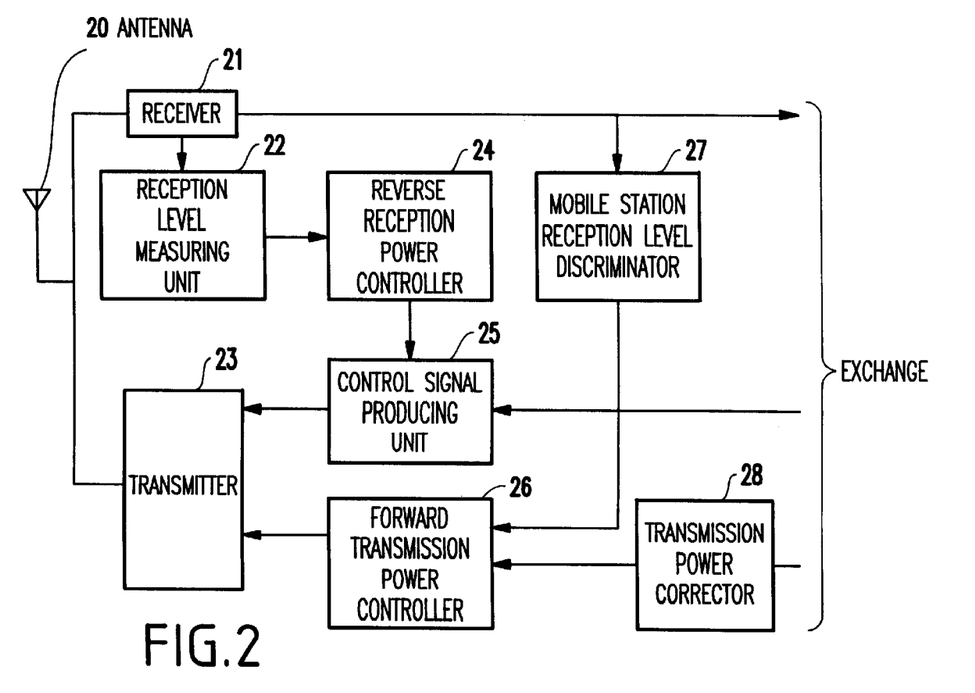
FIG. 2 is a block diagram showing a first embodiment of a base station shown in FIG. 1.

Each of base stations 12, 13 in the present embodiment includes, as shown in FIG. 2, antenna 20 for transmission and reception, receiver 21 for receiving a signal transmitted from mobile station 14, reception level measuring unit 22 for measuring the reception level of the signal received by receiver 21, reverse reception power controller 24 for controlling the reverse reception power based on a result of the measurement of reception level measuring unit 22, control signal producing unit 25 for producing a control signal for controlling the transmission power of mobile station 14 so that the reverse reception power controlled by reverse reception power controller 24 may be obtained, transmitter 23 for transmitting a signal including the control signal produced by control signal producing unit 25 to mobile station 14, mobile station reception level discriminator 27 for discriminating the reception level of the signal of mobile station 14 from among signals received by receiver 21, transmission power corrector 28 for calculating a correction value for correcting the forward transmission power based on the reception level of mobile station 14 transmitted thereto from another base station through mobile switching center 11, and forward transmission power controller 26 for controlling the forward transmission power of transmitter 23 based on the result of the discrimination of mobile station reception level discriminator 27 or the correction value calculated by transmission power corrector 28.

In the following, operation of the base station having such a construction as described above is described.

A signal transmitted from mobile station 14 is received by receiver 21 through antenna 20 and then transmitted to mobile switching center 11. Simultaneously, the reception power level of the signal received is measured by reception level measuring unit 22. A result of the measurement of reception level measuring unit 22 is transmitted to reverse reception power controller 24, by which it is compared with a threshold value designated in advance. Thereafter, a control signal for setting the transmission power of mobile station 14 is produced based on a result of the comparison of reverse reception power controller 24 by control signal producing unit 25. The control signal thus produced is transmitted from transmitter 23 to mobile station 14 through antenna 20.

Meanwhile, mobile station 14 measures the reception levels of forward signals transmitted from base stations 12, 13 and transmits results of the measurement to base stations 12, 13. In each of base stations 12, 13, the result of the measurement transmitted from mobile station 14 is received by receiver 21 through antenna 20 and then sent to mobile station reception level discriminator 27. Consequently, the result of the measurement transmitted from mobile station 14 is compared with the threshold value designated in advance by mobile station reception level discriminator 27. As a result, forward transmission power controller 26 controls the forward transmission power of transmitter 23 based on a result of the comparison of mobile station reception level discriminator 27.

It is to be noted that, although hereinafter described, if the base station effects forward communication with mobile station 14 but does not receive a reverse transmission signal transmitted from mobile station 14 like base station 13 shown in FIG. 1, transmission power corrector 28 calculates a correction value to be used for correction of the forward transmission power based on a reception level of mobile station 14 sent thereto from another base station 12 through mobile switching center 11, and forward transmission power controller 26 sets a forward transmission power based on the correction value calculated by transmission power corrector 28. A signal is transmitted from transmitter 23 with the forward transmission power thus set.

Figure 3:
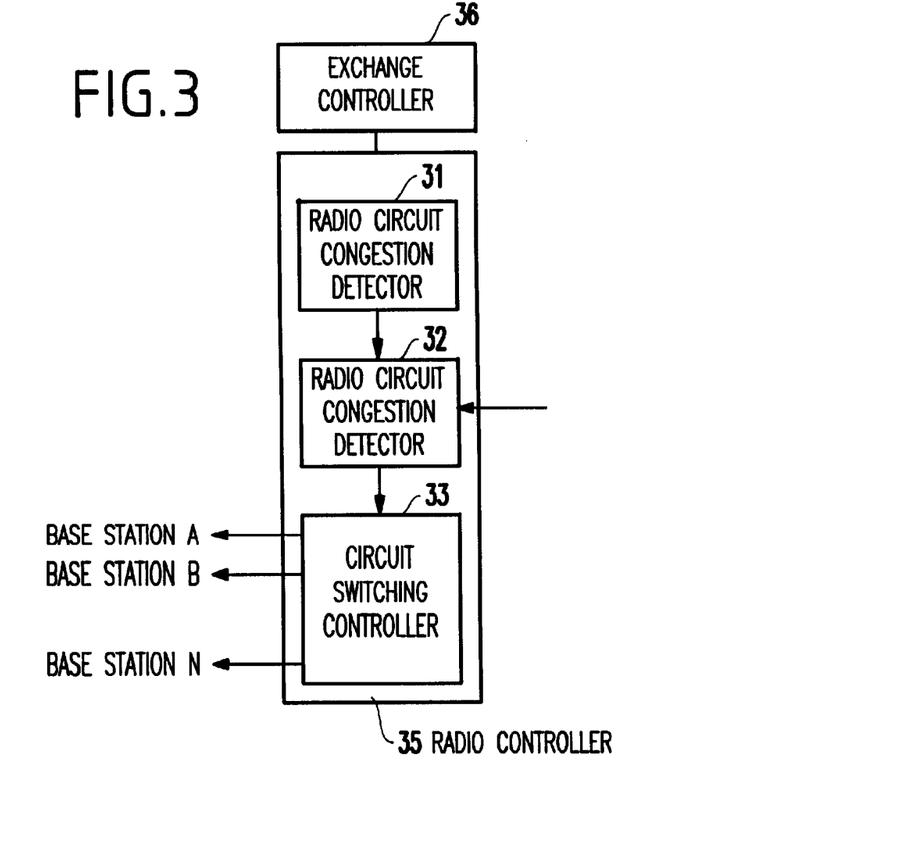
FIG. 3 is a block diagram showing an example of a construction of an mobile switching center shown in FIG. 1.

Mobile switching center 11 in the present embodiment includes, as shown in FIG. 3, radio controller 35 for switching connections between base stations 12, 13 and mobile station 14, and exchange controller 36 for performing exchanging control with network 17. Radio controller 35 includes a plurality of radio circuit congestion detectors 31, 32 (only two radio circuit congestion detectors are shown) for detecting a congestion condition of communication channels in the wireless zones of base stations 12, 13, and circuit switching controller 33 for switching connections between base stations 12, 13 and mobile station 14 based on results of the detection of radio circuit congestion detectors 31, 32. It is to be noted that radio circuit congestion detector 31 detects a congestion condition of communication channels in the wireless zone of base station 12 while radio circuit congestion detector 32 detects a congestion condition of communication channels in the wireless zone of base station 13, and each of them performs congestion detection for the reverse-link and the forward-link independently of each other.

Figure 4:
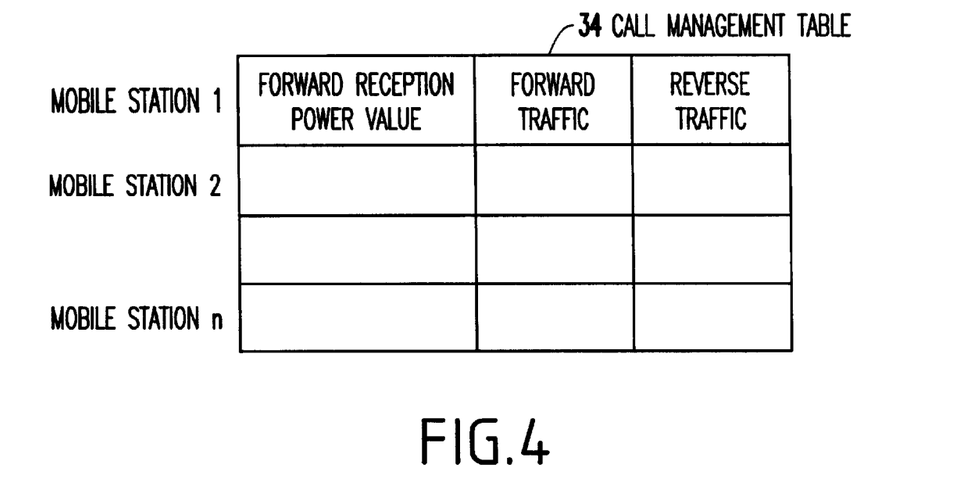
FIG. 4 is a schematic view showing a call management table provided in a radio circuit congestion detector shown in FIG. 3.

After mobile station 14 starts communication, call management table 34 shown in FIG. 4 is produced. If congestion of communication channels is detected, then the forward reception level and the reverse and forward traffic are discriminated for each mobile station, and those of mobile stations present around the wireless zones of the base stations managed by mobile switching center 11 which use the channel with which the congestion has been detected are detected.

Thereafter, for those of the thus detected mobile stations which are at positions where they can communicate with different base stations, circuit switching control is performed by circuit switching controller 33.

In the following, a radio circuit controlling method for the mobile radio communication system having such a construction as described above is described.

Figure 5:
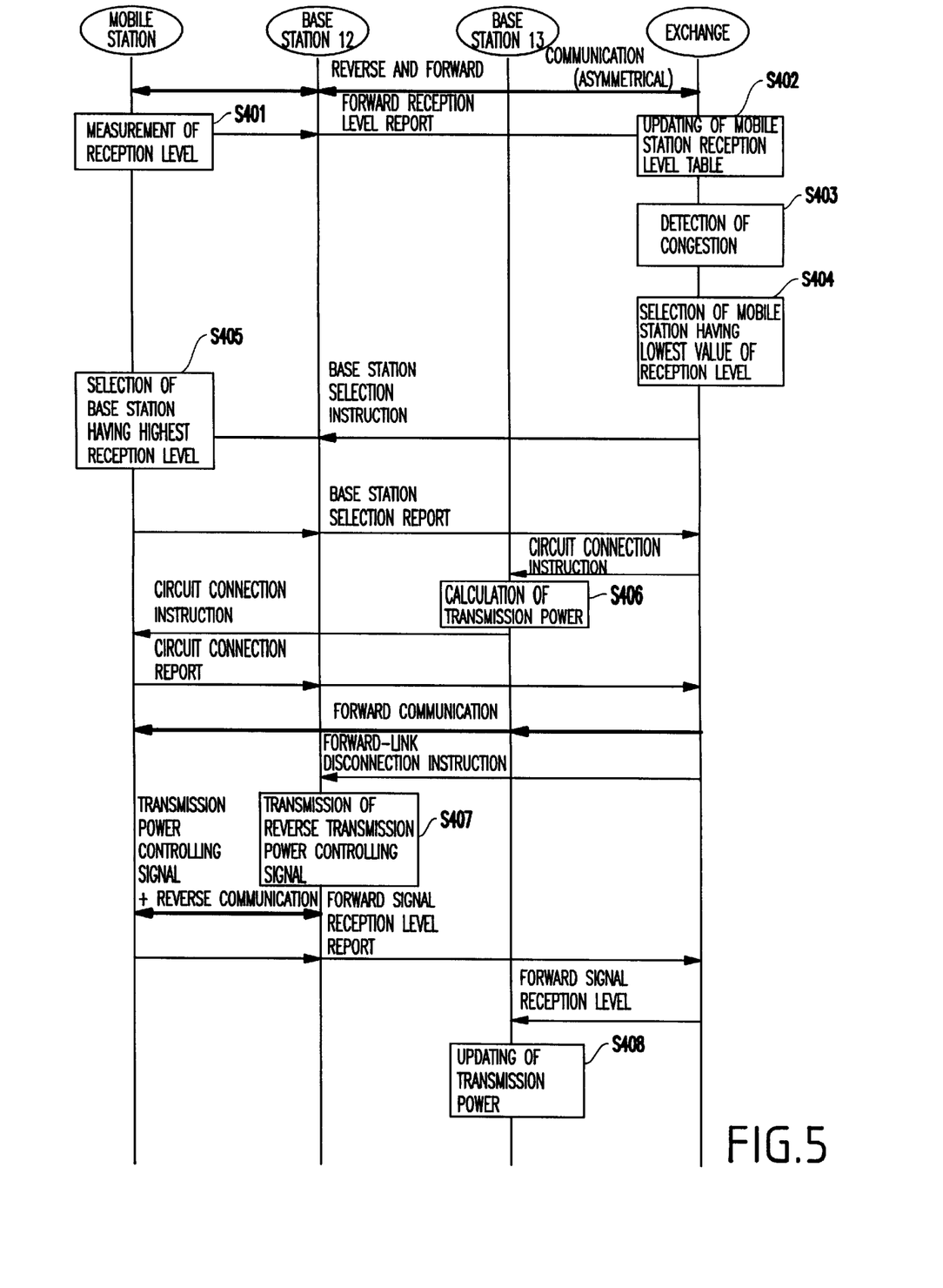
FIG. 5 is a flow chart illustrating processing upon detection of congestion of the mobile radio communication system shown in FIG. 1.

First, processing upon detection of congestion is described with reference to FIG. 5.

It is assumed that mobile station 14 is communicating with mobile switching center 11 through base station 12.

If a signal of the forward-link transmitted from base station 12 is received by mobile station 14, then the reception level of the received signal is measured at step S401, and the measured reception level is reported to mobile switching center 11 through mobile station 14.

After the reception level of mobile station 14 is reported to mobile switching center 11, at step S402 mobile switching center 11 updates the mobile station reception level information of call management table 34 (refer to FIG. 4) which was produced upon the call connection. It is to be noted that, for each mobile station, at least the reception level in the forward-link of the mobile station and the traffic of the reverse-link and forward-link which were set upon the call connection are stored in call management table 34. Further, updating processing of information stored in call management table 34 is performed periodically after each fixed time set in advance.

If a new call is originated in base station 12, then mobile switching center 11 starts call connection and discriminates whether or not the traffic at present is higher than an allowable traffic of base station 12 set in advance. If it is discriminated that the allowable traffic is exceeded, then it is discriminated by base station 12 that congestion of a radio circuit has occurred at step S403. In this instance, it is discriminated whether or not congestion occurs in both the reverse-link and the forward-link. As a congestion detection method, a method wherein mobile switching center 11 inquires to base station 12 about the a congestion condition of a communication channel in the wireless zone may be employed.

If congestion occurs in the forward-link of mobile station 14, then mobile switching center 11 selects the mobile station 14 that exhibits the lowest forward reception level from call management table 34 of base station 12 at step S404.

After the mobile station 14 which exhibits the lowest forward reception level has been selected in step S404, mobile switching center 11 transmits to mobile station 14 a command to check reception conditions of signals from the individual base stations to discriminate whether or not there is a base station with which mobile station 14 can communicate other than base station 12 and send, if mobile station 14 can communicate with a plurality of base stations, a report indicating from which mobile station 14 can receive with the highest reception level. When the command from mobile switching center 11 is received by mobile station 14, mobile station 14 receives radio waves from a plurality of base stations thereabout and selects the base station 13 which it can receive with the highest reception level at step S405, and a result of the selection is reported from mobile station 14 to mobile switching center 11.

After the result of the selection of mobile station 14 is reported to mobile switching center 11, mobile switching center 11 sends out a circuit connection instruction to mobile station 14 through base station 12 to effect transmission to base station 12 in the reverse-link. Simultaneously, mobile switching center 11 sends out another circuit connection instruction to base station 13 to connect the forward-link to mobile station 14.

Here, while one mobile station is normally connected to the same base station in both the reverse-link and forward-link, in the present embodiment, mobile station 14 is connected to base station 13 in the forward-link in which congestion occurs, but is connected, in the reverse-link in which no congestion occurs, to base station 12 in accordance with the original zone division.

The reception level from base station 12 and the reception level from base station 13 at mobile station 14 are transmitted together with the circuit connection instruction to base station 13, and the transmission power to mobile station 14 is calculated based on the received reception levels by base station 13 at step S406.

After the circuit connection is completed, the completion is reported by mobile station 14 to mobile switching center 11, and by control of mobile switching center 11, communication from base station 13 to mobile station 14 is started and the forward-link communication from base station 12 to mobile station 14 is stopped.

From base station 12 whose forward-link communication has been stopped, only a control signal for a reverse transmission power necessary for mobile station 14 to effect transmission power control of the reverse-link is transmitted to base station 12 at step S407. Here, since the control signal transmitted from base station 12 is transmitted at a lower value than an ordinary signal communicated, even when the circuit communication is stopped, transmission of the control signal over the circuit thus stopped does not cause interference with any other communication.

At mobile station 14 whose forward-link has been set with base station 13, the reception level of a signal transmitted from base station 13 is measured, and a result of the measurement is transmitted from mobile station 14 to base station 13 through base station 12 and mobile switching center 11.

After a result of the measurement of the reception level of mobile station 14 is received by base station 13, base station 13 controls its own transmission power based on the received reception level at step S408.

Figure 6:
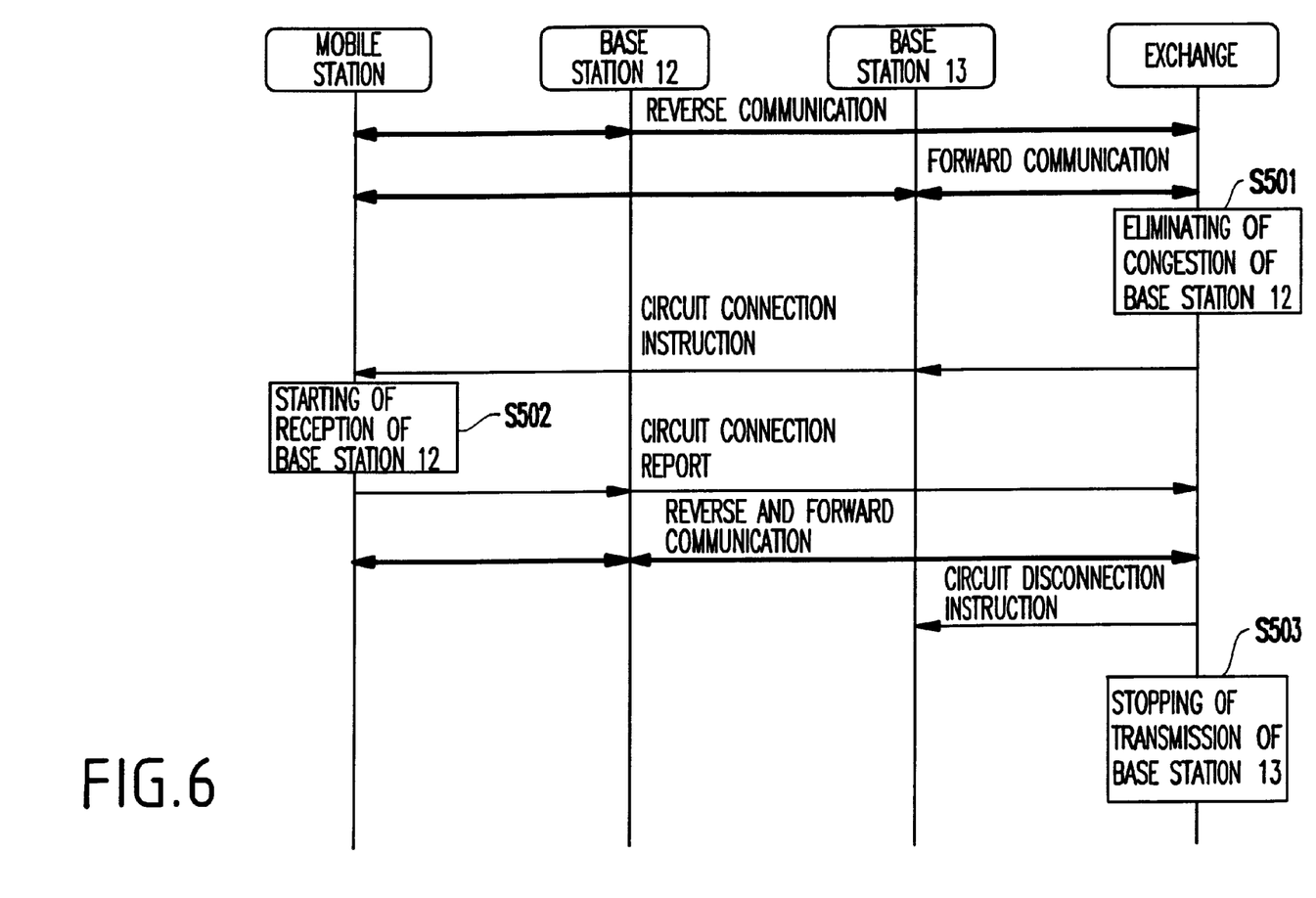
FIG. 6 is a flow chart illustrating processing upon elimination of congestion of the mobile radio communication system shown in FIG. 1.

Now, processing when congestion is eliminated is described with reference to FIG. 6.

If another mobile station (not shown) which has been communicating with base station 12 moves into the wireless zone of another base station or ends its communication, then mobile switching center 11 either calculates the free capacity of the radio circuits of base station 12 or calculates the free capacity of the radio circuits of base station 12 directly or through base station 12. After the free capacity of the radio circuits is calculated, mobile switching center 11 compares the free capacity of the forward-link of base station 12 and the traffic by forward-link communication from base station 13 to mobile station 14 with each other. When the free capacity is larger, mobile switching center 11 detects congestion elimination of base station 12 at step S501.

If congestion elimination is detected, then mobile switching center 11 sends out a circuit switching instruction to mobile station 14 through base station 13 to use the forward-link from base station 12 for reception. At mobile station 14, having received the circuit switching instruction, preparations for reception of forward-link communication from base station 12 are performed at step S502, and a circuit connection report is transmitted from mobile station 14 to mobile switching center 11 through base station 12 using the reverse-link.

After the circuit connection report is received by mobile switching center 11, by control of mobile switching center 11, the forward-link communication signal is transmitted from base station 12 to mobile station 14 while a forward-link disconnection instruction to mobile station 14 is transmitted from mobile switching center 11 to base station 13. Consequently, transmission from base station 13 to mobile station 14 is stopped at step S503.

Figure 7:
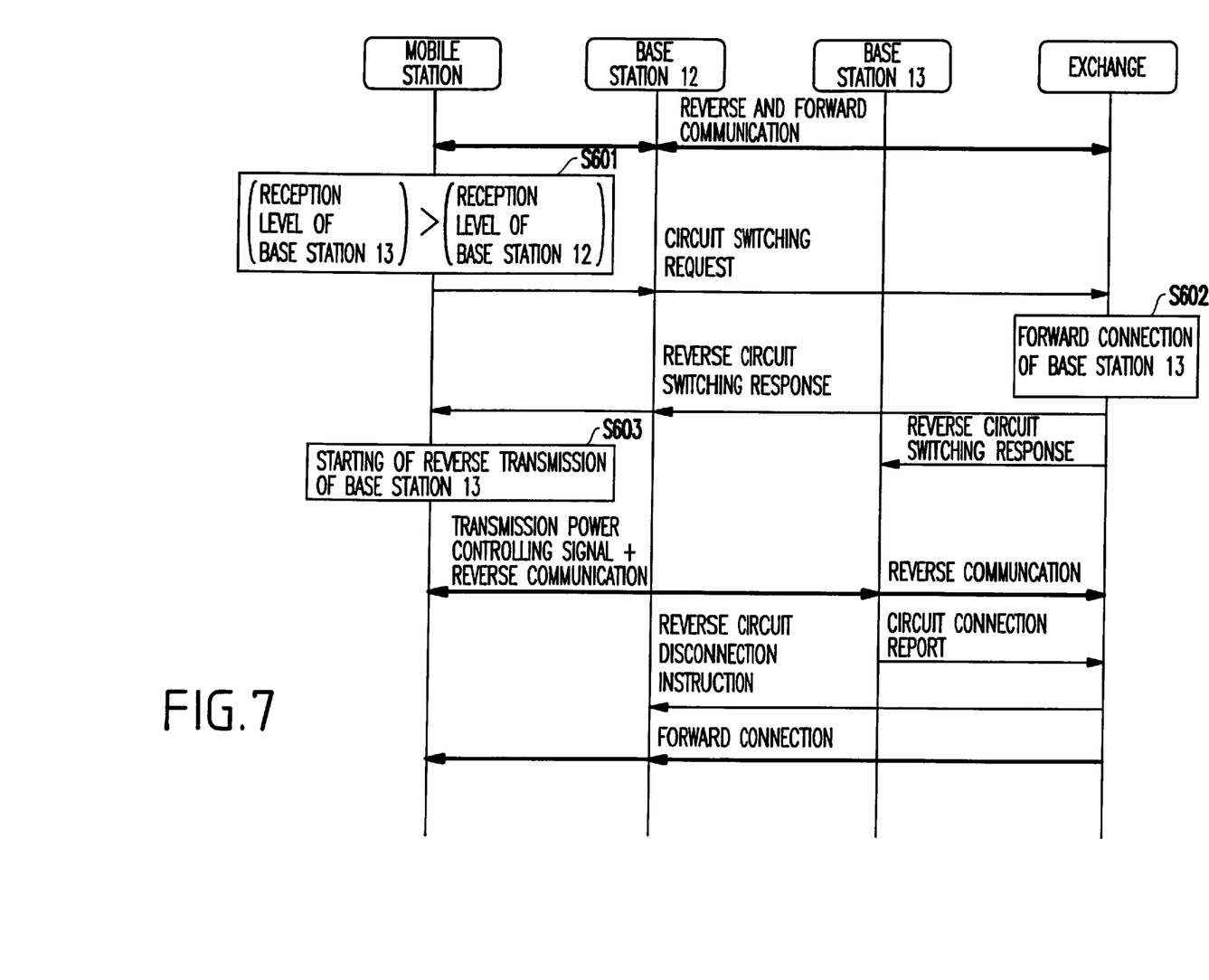
FIG. 7 is a flow chart illustrating processing upon circuit switching of the mobile radio communication system shown in FIG. 1.

Now, processing when mobile station 14 moves from wireless zone 15 of base station 12 to wireless zone 16 of base station 13 is described with reference to FIG. 7.

If mobile station 14 communicating with mobile switching center 11 through base station 12 moves until it is discriminated, in the updating processing for call management table 34 (refer to FIG. 4) which is performed periodically, that the reception level of the radio wave transmitted from base station 13 is higher than the reception level of the radio wave transmitted from base station 12 at step S601, then a circuit switching request is issued. More particularly, a circuit switching request to base station 13 is sent out from mobile station 14 to mobile switching center 11 through base station 12, and mobile switching center 11 which receives the circuit switching request compares the traffic of the reverse-link and forward-link of mobile station 14 from call management table 34 of base station 12 with the free capacity of base station 13.

If the traffic of mobile station 14 exceeds the free capacity of the circuits of base station 13, then since no radio circuit to base station 13 can be switched, a circuit switching inhibition signal is transmitted from mobile switching center 11 to mobile station 14 (not shown), and the communication between mobile station 14 and base station 12 is continued.

On the other hand, if the traffic in only one of either the reverse-link or forward-link is smaller than the free capacity of the circuits of base station 13, then switching is performed only for that link. For example, if the free capacity only of the reverse-link of base station 13 is higher while congestion occurs in the forward-link at step S602, then a reverse-link switching signal is transmitted from mobile switching center 11 to mobile station 14 through base station 12. A reverse-link switching signal is transmitted also to base station 13. Consequently, base station 13 which receives the signal starts reception of a signal using the reverse-link from mobile station 14 at step S603.

After reception of a signal by base station 13 using the reverse-link from mobile station 14 is started, a signal is transmitted from mobile station 14 to base station 13, and base station 13 which receives the signal measures the reception level of the signal.

Thereafter, a required transmission level for mobile station 14 is determined based on the thus measured reception level, and a transmission power control signal for setting the output power of mobile station 14 to the required transmission level is produced and transmitted from base station 13 to mobile station 14.

Further, the reverse-link connection report is transmitted from base station 13 to mobile switching center 11, and mobile switching center 11 which receives the reverse-link connection report transmits a reverse-link disconnection instruction to base station 12. Consequently, base station 12 which receives the circuit disconnection instruction stops its transmission of the reverse-link to mobile station 14. Meanwhile, as regards the forward-link, since it is in a so-called congestion condition wherein the traffic of mobile station 14 is greater than the free capacity of the circuit of base station 13, a forward-link switching inhibition signal is transmitted from mobile switching center 11 to mobile station 14, and consequently, the communication between mobile station 14 and base station 12 is continued.

Mobile station 14 which communicates with base station 12 in the forward-link and base station 13 in the reverse-link in this manner measures the reception level of a signal transmitted from base station 12 and transmits the measured reception level to base station 12 through base station 12 and mobile switching center 11. Consequently, base station 12 controls the transmission power based on the reception level measured by mobile station 14.

It is to be noted that, if the free capacity is larger than the traffic in both the reverse-link and forward-link, then since switching is possible for both the reverse-link and forward-link, radio circuit switching is performed in an ordinary manner for both the reverse-link and forward-link (not shown).

In the following, selection of a mobile station which is to perform circuit switching upon congestion in the present embodiment is described in detail with reference to FIG. 8.

Figure 8:
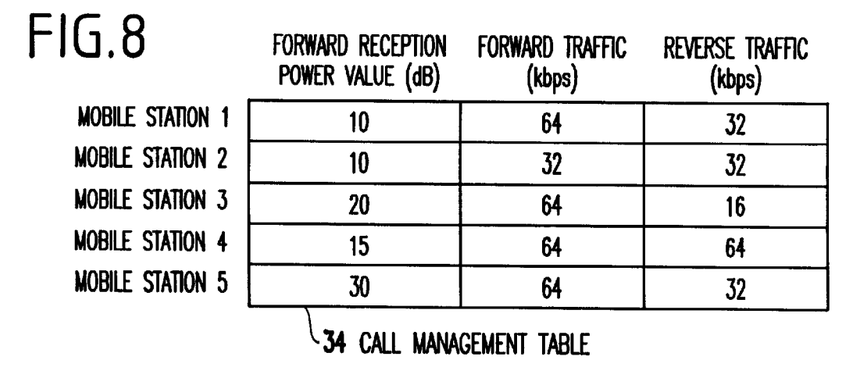
FIG. 8 is a view showing an example of the call management table shown in FIG. 4.

In FIG. 8, mobile station 5 originates a call while four mobile stations 1 to 4 are connected in wireless zone 15 of base station 12. It is to be noted that the maximum channel capacity of base station 12 is 256 Kbps, and base station 13 does not include a mobile station which is in communication. It is assumed that, in the condition described above, mobile station 5 which is positioned near the center of the wireless zone originates a call for communication with the forward transmission speed of 64 Kbps and the reverse transmission speed of 32 Kbps.

However, if communication between mobile station 5 and base station 12 is started, then since the traffic in the forward-link exceeds the maximum transmission capacity of base station 12, the communication is not permitted. Thus, the reception levels (power values) of the forward-links of the mobile stations are compared with each other, and mobile station 1 and mobile station 2 which exhibit the lowest reception level are selected. Further, the forward transmission speeds of mobile station 1 and mobile station 2 are compared with each other, and mobile station 2 to which a new call can be connected is selected as an object of switching and switching of mobile station 2 between the base stations is performed It is to be noted that it is described in the present embodiment that a mobile station selected for switching can communicate also with another base station. However, if there exists no other base station which can communicate with the selected mobile station, then one of mobile communications communicatable with other base stations which satisfies the requirements regarding the reception level and the traffic described above as much as possible.

Second Embodiment

Figure 9:
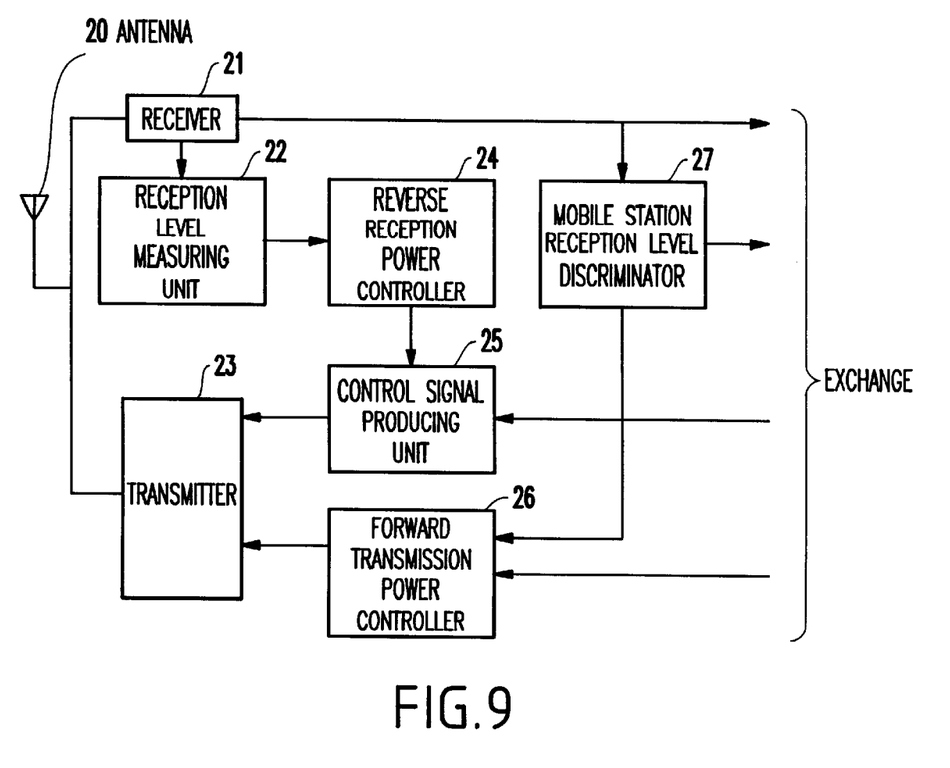
FIG. 9 is a block diagram showing a second embodiment of the base station shown in FIG. 1.

Base stations 12, 13 in the present embodiment are different from those shown in FIG. 2 only in that, as seen from FIG. 9, a result of comparison of mobile station reception level discriminator 27 is transmitted to another base station throughmobile switching center 11 and that theydo not include transmission power corrector 28. When forward transmission to mobile station 14 is performed but a reverse transmission signal transmitted from mobile station 14 is not received, like base station 13 shown in FIG. 1, forward transmission power controller 26 sets a forward transmission power based on a result of comparison sent thereto from the other base station 12 through mobile switching center 11, and a signal is transmitted from transmitter 23 with the thus set forward transmission power.

In the present embodiment, since only a result of comparison of reverse reception power controller 24 is transmitted to the other base stations, the number of signals to be transmitted can be reduced.

It is to be understood that variations and modifications of MOBILE RADIO COMMUNICATION SYSTEM disclosed herein will be evident to those skilled in the art. It is intended that all such modifications and variations be included within the scope of the appended claims.

What is claimed is:

1. A mobile radio communication system, comprising:
a plurality of mobile stations;
a plurality of radio means which can be connected to said mobile stations through radio circuits; and
a radio control means for controlling connections between said mobile stations and said radio means, wherein said radio control means includes circuit switching means for independently connecting said mobile stations to said radio means using a reverse-link from a mobile station to a first radio means and a forward-link from a second radio means, which is adjacent to said first radio means, to said mobile station, wherein said radio control means includes congestion detection means for detecting congestion conditions of said reverse-link and said forward-link between said mobile stations and said radio means independently of each other, and wherein said circuit switching means changes a base station to be connected to said mobile station only for a circuit in which a congestion condition has been detected by said congestion detection means.

2. A mobile radio communication system according to claim 1, wherein said radio control means includes a management table in which reception levels of a signal transmitted from one of said base stations by said plurality of mobile stations and traffic at said base stations are stored, and said circuit switching means changes a base station to be connected to a mobile station based on reception levels and traffic stored in said management table when a congestion condition is detected by said congestion detection means.

3. A mobile radio communication system according to claim 2, wherein said circuit switching means changes a base station of a mobile station using a circuit in which congestion is detected to a base station which exhibits a lowest reception level stored in said management table, when a congestion condition is detected by said congestion detection means.

4. A radio circuit controlling method for a mobile radio communication system, which includes at least a plurality of mobile stations, and a plurality of radio means which can be connected to said mobile stations through radio circuits, comprising:

independently connecting said mobile stations and said radio means for a reverse-link from said mobile station to said radio means and a forward-link from said radio means to said mobile station;

detecting congestion conditions in said reverse-link and said forward-link between said mobile stations and said radio means independently of each other; and changing said radio means which has been detected to be in a congestion condition for another radio means which is not in a congestion condition.

5. A radio circuit controlling method for a mobile radio communication system according to claim 4, further comprising:

changing a base station of a mobile station based on reception levels at said plurality of mobile stations of a signal transmitted from one of said base stations and traffic at said base station when congestion conditions in a circuit between said mobile stations and said radio means are detected.

6. A radio circuit controlling method for a mobile radio communication system according to claim 5, further comprising:

changing a base station of a mobile station using a circuit in which congestion is detected to one which exhibits a lowest reception level when a congestion condition of a circuit between said mobile stations and said radio means is detected.

7. A radio circuit controlling method for a mobile radio communication system, comprising the steps of:

measuring congestion in the reverse-link and the forward-link of a base station;

switching the reverse-link or forward-link of a mobile station in the wireless zone of said base station to communicate with an adjacent base station;

measuring reception levels of signals from said base station and adjacent base station by said mobile station;

reporting the reception levels and transmission power of said base station to said adjacent base station; and controlling the transmission power of said base station or said adjacent base station and controlling the transmission power of said mobile station based on the reported reception levels and transmission power.

* * * * *